United States Patent [19]

Apman et al.

[11] Patent Number: 4,580,960
[45] Date of Patent: Apr. 8, 1986

[54] APPARATUS FOR MAKING LAMINATED LIGNOCELLULOSE FIBER MATS

[75] Inventors: Bertram A. Apman, Bellevue; Earl C. Dahlin, Kent, both of Wash.

[73] Assignee: Feber Search Partnership, Redmond, Wash.

[21] Appl. No.: 539,041

[22] Filed: Oct. 4, 1983

[51] Int. Cl.⁴ .............................................. B27N 3/12
[52] U.S. Cl. .................................. 425/81.1; 19/296; 156/62.2; 156/62.4; 425/83.1
[58] Field of Search ................... 47/9, 56; 425/80.1, 425/81.1, 82.1, 83.1; 156/62.2, 62.4, 555; 19/144, 148, 296, 302-305

[56] References Cited

U.S. PATENT DOCUMENTS

| Re. 28,950 | 8/1976 | Jankowiak et al. | 405/19 |
|---|---|---|---|
| 2,243,857 | 6/1941 | Fischer | 47/56 |
| 2,288,072 | 6/1942 | Collins | 425/82.1 |
| 2,493,194 | 1/1950 | Heino | 264/121 |
| 2,691,852 | 10/1954 | Slayter et al. | 19/144 |
| 2,698,271 | 12/1954 | Clark | 425/81.1 |
| 2,702,069 | 2/1955 | Lannan | 425/80.1 |
| 2,711,381 | 6/1955 | Novotny et al. | 19/304 |
| 2,810,940 | 10/1957 | Mills | 19/302 |
| 2,949,698 | 8/1960 | Downey et al. | 47/9 |
| 2,951,269 | 9/1960 | Vajda et al. | 425/80.1 |
| 2,976,646 | 3/1961 | Hansen et al. | 47/56 |
| 3,006,410 | 10/1961 | Ferla | 425/80.1 |
| 3,051,219 | 8/1962 | Kaiser | 425/80.1 |
| 3,230,987 | 1/1966 | Caron et al. | 425/83.1 |
| 3,340,127 | 9/1967 | Buerkner | 425/82.1 |
| 3,737,265 | 6/1973 | Schafer et al. | 425/83.1 |
| 3,914,901 | 10/1975 | Muldner | 47/56 |
| 3,938,279 | 2/1976 | Fonne | 47/9 |
| 3,940,884 | 3/1976 | Mason, Jr. | 47/32 |
| 4,357,780 | 11/1982 | Ball | 47/56 |

FOREIGN PATENT DOCUMENTS

| 2150770 | 4/1973 | Fed. Rep. of Germany | 47/56 |
|---|---|---|---|
| 2442809 | 8/1980 | France | 47/56 |
| 48-9324 | 3/1973 | Japan | 405/264 |
| 48-27004 | 8/1973 | Japan | 405/264 |
| 51-100447 | 4/1976 | Japan | 47/9 |
| 52-69706 | 6/1977 | Japan | 47/56 |
| 903499 | 6/1978 | United Kingdom | |
| 2035283A | 6/1980 | United Kingdom | 47/56 |
| 2052234A | 1/1981 | United Kingdom | |

Primary Examiner—Willard E. Hoag
Attorney, Agent, or Firm—Seed and Berry

[57] ABSTRACT

Apparatus for making a low density fibrous mat for use as a self-contained support system to enhance the growth and probability of survival of an established seedling or a viable seed which has at least two adjoining layers of lignocellulose fibers bonded together by an adhesive of the type weakened by exposure to an outdoor environment. The apparatus is characterized by a pneumatic fiber conveying and depositing means in which the pneumatic conveyor is charged by rotatable tined shafts above a screw-conveyor and a following belt conveyor from which the fibers are drawn into the pneumatic conveying system for eventual deposition on a continuous vacuum screen.

6 Claims, 12 Drawing Figures

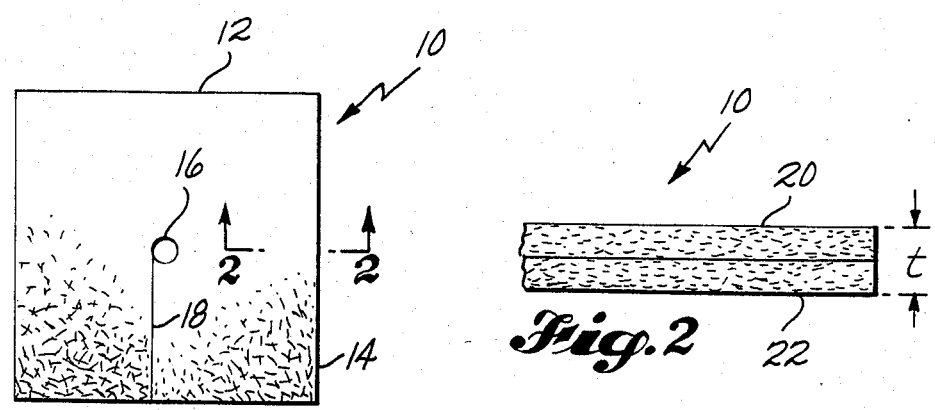
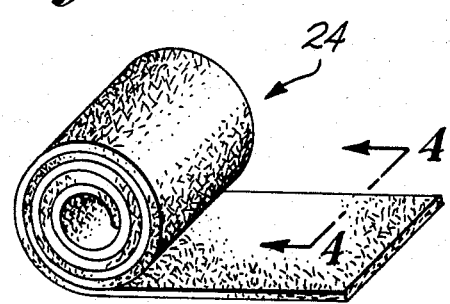
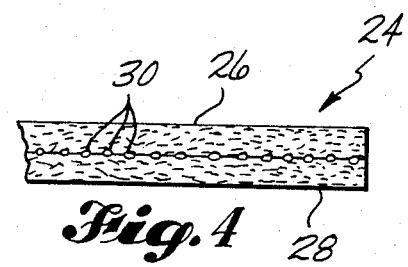
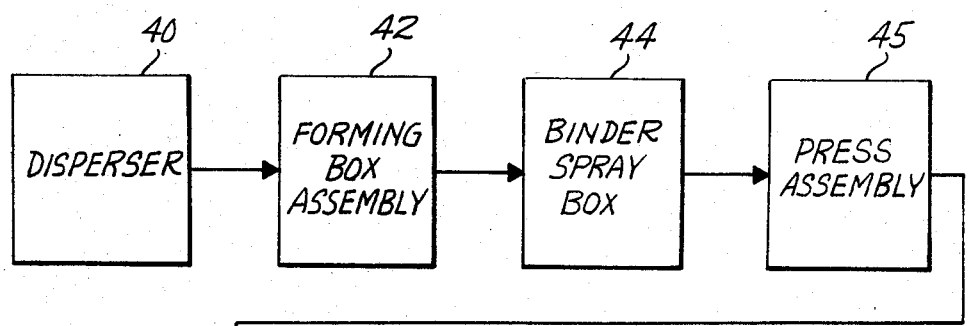
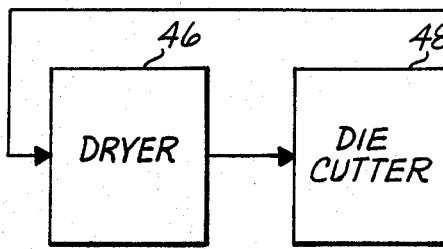

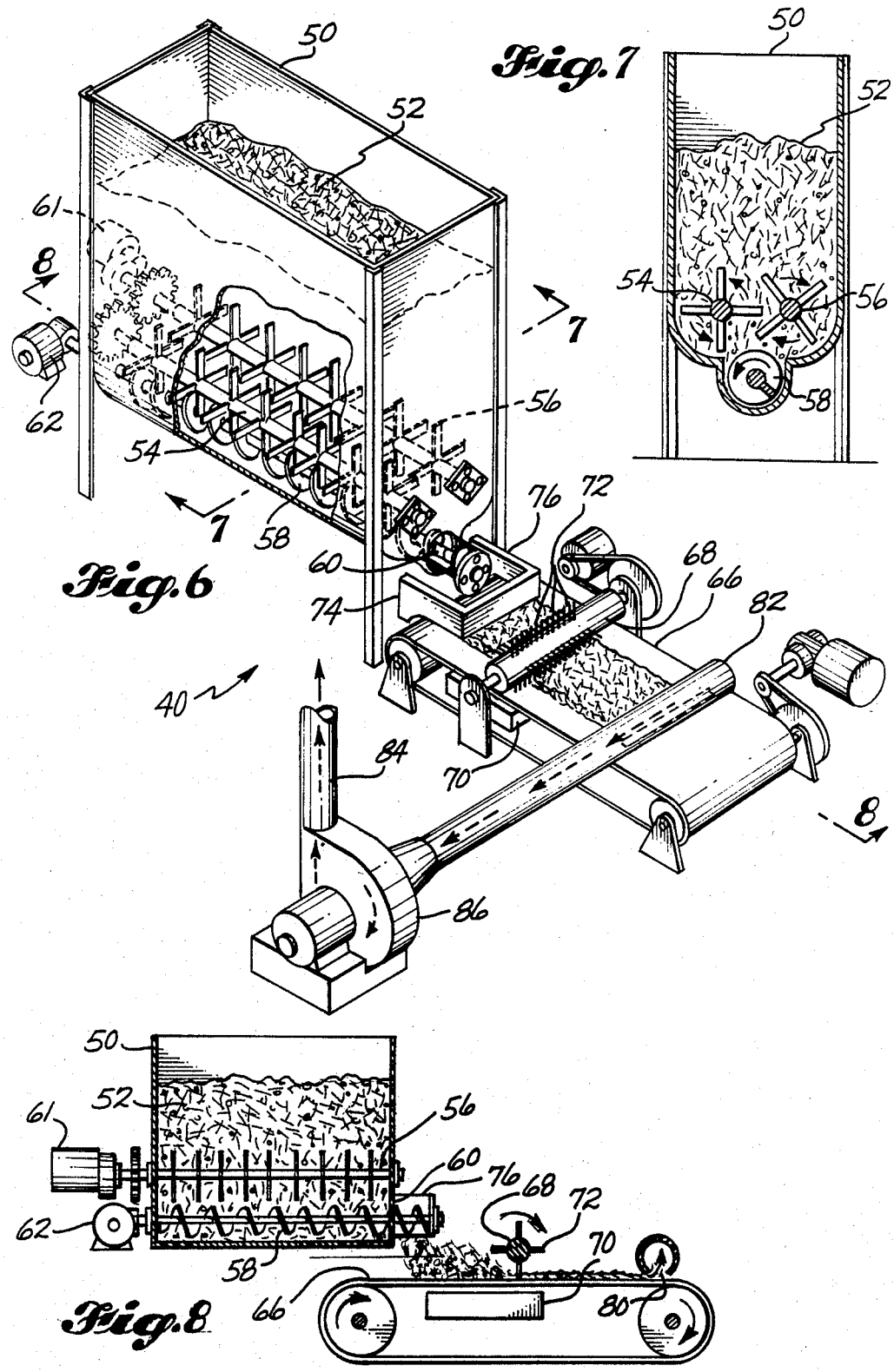

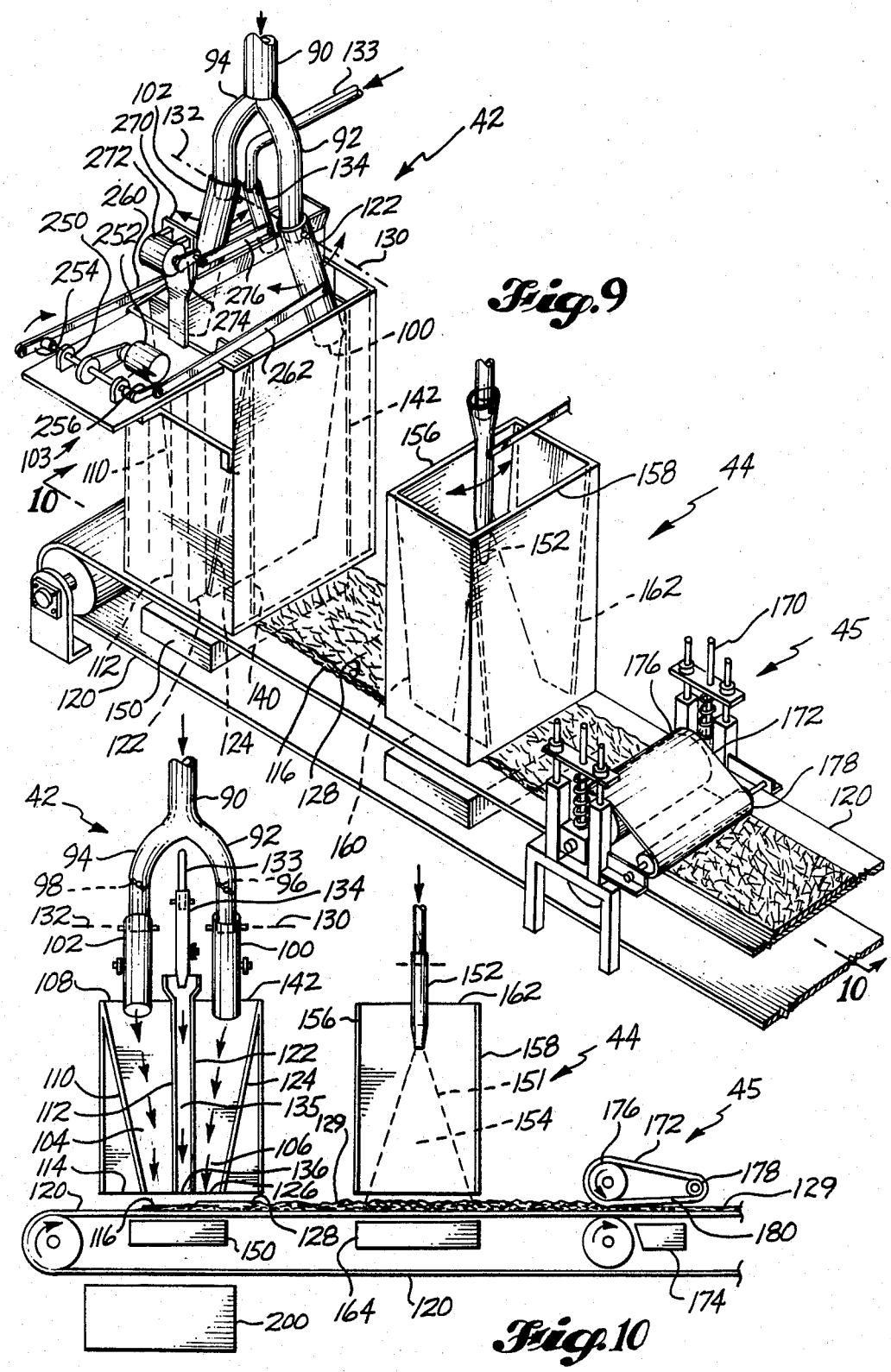

APPARATUS FOR MAKING LAMINATED LIGNOCELLULOSE FIBER MATS

BACKGROUND OF THE INVENTION

This invention generally relates to fibrous mats to be applied over soil to provide a favorable growth medium for seeds or seedlings. More particularly, it relates to a relatively thin laminated mat of lignocellulose fiber or the like bound with a preferably water soluble or water dispersible adhesive and an improved apparatus and process for manufacturing such a mat.

It is well known that the growth rate and chances of survival of a seedling can be greatly improved if the soil immediately surrounding it is covered with a mulch. Among the varieties which can benefit from such treatment are conifers, fruit trees and grapes. The mulch will prevent erosion, retain moisture and nutrients, suppress the growth of competing vegetation and provide some protection against the extreme temperature changes. Materials which have been used for this purpose range from loose dry straw to mixtures of various ingredients added to water and sprayed on the soil. Protective soil coverings have also been made in the form of mats using materials such as paper, cardboard and plastic.

It is also known to incorporate viable seeds and fertilizers in a fibrous mat during the manufacturing process. A mat of this type provides an ideal medium for germination as well as protection and stimulation for the resulting seedling.

While these various soil coverings ideally should provide for more efficient growth of trees and vegetation, each has inherent limitations which have limited its usefulness. The use of loose material such as straw, while simple and inexpensive, tends to be ineffective because the material can be rather easily washed or blown away. Materials which require bulky or heavy equipment to spread are usually not practical for use in remote or limited access areas. Paper or cardboard mats are inexpensive and easy to handle but do not conform well to the soil and are prone to deform and blow away. Mats made of biodegradable fibers are ideal but have proven to be difficult and expensive to manufacture. They must be flexible enough to conform to the contours of the soil and yet cohesive enough to permit handling. It is desirable that they be relatively thin and of fairly uniform density. If the mats are to contain seeds it is generally desirable to laminate them but the laminating processes formerly used have required costly materials and complex machinery and have resulted in a costly product.

Accordingly it is an object of this invention to provide for a relatively thin, low density mat of lignocellulose fibers which will function as a self-contained support system for an established seedling. It is also an object of this invention to provide for such a mat as a medium for the germination of a viable seed.

It is a further object of this invention to provide a practical and economical method and apparatus for manufacturing such a mat.

SUMMARY OF THE INVENTION

This invention can be broadly summarized as a low density laminated mat having at least two adjoining layers of randomly oriented lignocellulosic fibers and a centrally disposed opening permitting the mat to be placed around the trunk of a seedling and an adhesive dispersed throughout the layer for binding the fibers and layers together, said adhesive being degradable upon exposure to an outdoor environment.

This invention can also be summarized as an apparatus for manufacturing a low density laminated mat of lignocellulosic material or the like which includes a disperser for dispersing the material in a stream of air, a forming box assembly for depositing at least one layer of the material on a forming wire, an adhesive spray box, a press assembly, a dryer and a cutting assembly.

This invention can be further summarized as a method of manufacturing a low density laminated mat of lignocellulosic material comprising the steps of dispersing the material in an airstream, depositing the material on a forming wire to form a continuous mat and bonding the material with a suitable adhesive.

BRIEF DESCRIPTION OF THE DRAWINGS

FIG. 1 illustrates a first embodiment of the disclosed invention which is intended to be placed on the soil around an established seedling.

FIG. 2 is a partial sectional view, not to scale, taken at 2—2 in FIG. 1.

FIG. 3 illustrates a second embodiment of the invention containing viable seeds and fertilizer and being partially rolled for convenient handling and storage.

FIG. 4 is a partial sectional view, not to scale, taken at 4—4 in FIG. 3.

FIG. 5 is a schematic diagram of the disclosed manufacturing apparatus.

FIG. 6 is an isometric view, partially cut away, of the disperser shown in FIG. 5.

FIG. 7 is a sectional view of the disperser taken at 7—7 in FIG. 6.

FIG. 8 is another sectional view of the disperser taken at 8—8 in FIG. 7.

FIG. 9 is an isometric view of the forming box assembly, spray box and press assembly of FIG. 5.

FIG. 10 is a sectional view taken at 10—10 in FIG. 9.

DESCRIPTION OF THE PREFERRED EMBODIMENTS

Figure 11:
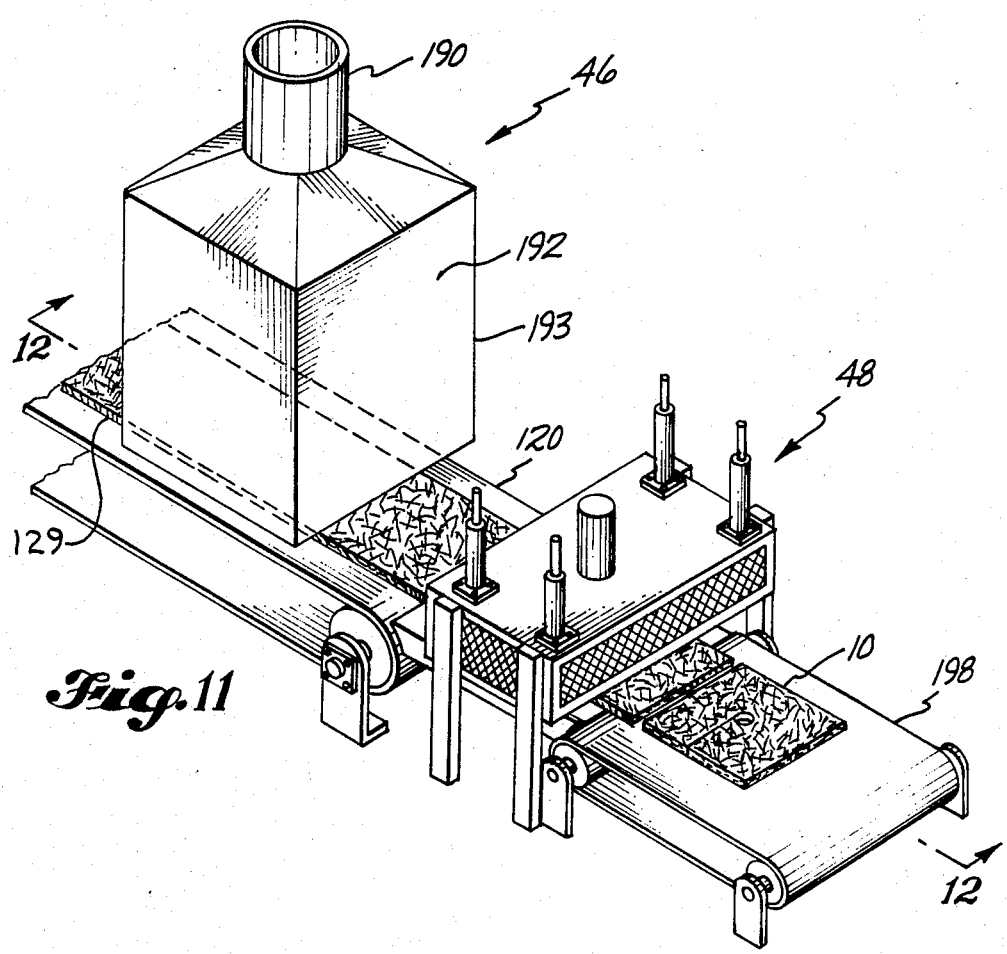
FIG. 11 is an isometric view of the dryer and die cutter of FIG. 5.

The novel features believed characteristic of this invention are set forth in the appended claims. The invention itself, however, may be best understood and its objects and advantages best appreciated by reference to the detailed description below in connection with the accompanying drawings.

FIGS. 1 and 2 show one embodiment of the disclosed invention, hereinafter referred to as a seedling mat and generally designated by the number 10, which is intended to function as a protective covering or mulch around the base of a growing seedling. Preferably the mat is square, having sides 12 and 14 of approximately 15 inches in length each, a centrally located circular opening 16 approximately 1 inch in diameter, and a slit 18 which permits the mat to be placed about the trunk of a seedling. The exact dimensions or shape of the sides of the mat are not critical but it should be sized so that when placed about the seedling it covers the soil for at least 6 to 12 inches in all directions depending on the particular application.

It can be seen in FIG. 2 that the mat is composed of an upper layer 20 and a lower layer 22. Each of these layers is formed from lignocellulosic material such as wood fibers. In the context of this disclosure, the term "fiber" shall be understood to include fibers, fiber bundles and fiber fragments or fines. By selecting a particular type of wood fiber, the rate of decomposition of the mat can be controlled so that its effective lifetime can be varied. For example, if fibers from alder are employed then it will decompose in a short time, whereas, if cedar fibers are used it may remain effective for many years.

Both the layers and the fibers themselves are bonded together with a binder or adhesive of the type which is gradually weakened or destroyed when exposed to an outdoor type of environment. Preferably a water soluble or water dispersible one such as a resin, an emulsion or a starch is employed and should constitute approximately 7 to 10 percent of the weight of the finished mat. The seedling mat may contain between 30 and 50 grams of fibers per square foot but it has been found that approximately 35 grams per square foot is most desirable. A heavier mat tends to provide greater control or suppression of competing vegetation such as weeds and grasses. Preferably the thickness "t" of the seedling mat should be between ⅛ and ⅜th inch. The tensile strength of the finished mat is relatively low but sufficient enough to permit reasonable handling. Because it is fairly soft and pliable it can be placed around the seedling without the danger of harming its bark.

An important aspect of the disclosed mat is the protective environment it provides around a seedling. The fibers themselves have a natural tendency to absorb and retain water, thus protecting the seedling from excessive drying. The mat forms a protective covering over the surrounding soil which tends to reduce evaporation of moisture and subsequent cracking or crusting. The mat also acts as an insulator protecting the seedling from temperature extremes. It also helps retain the porosity of the soil by minimizing rain droplet compaction.

Another important characteristic of the mat is its tendency to conform rapidly to the contours of the soil upon which it is placed after being laid down. As soon as water is applied the binder begins to break down and the mat begins to lose structural integrity. It has been observed that even if water is not applied directly to the mat, it will usually absorb sufficient water from the surface of the soil to begin to break down.

An additional function of the mat is to act as a carrier for chemical additives beneficial to the development of the seedling. Among the types of additives which can be incorporated in the mat during manufacture are nutrients such as fertilizer or trace elements and growth stimulants to aid the development of its foliage or root system. Herbicides can be added to control broad leaf weeds or competing grasses. Various repellents can be used to protect the seedling from damage by rodents or deer. According to the manufacturing process described below, such additives can be included within any one or more layers of the mat.

Thus it can be seen that the disclosed mat together with appropriate additives will provide a self-contained support system for a developing seedling.

In FIGS. 3 and 4 the second embodiment of this invention which will be referred to as a "turf mat" is illustrated and generally designated by the numeral 24. The turf mat is very similar in construction to the seedling mat except that it is preferably cut into long strips about 2 feet wide and 50 feet long. These strips can be rolled, as shown in FIG. 3, for convenient handling and storage. Another difference between the embodiments is that the turf mat is of a lesser density than the seedling mat. It may contain between 15 and 25 grams of fibers per square foot but preferably has about 17 grams per square foot.

Another significant difference between the two embodiments is that viable seeds 30 such as grass seeds are disposed within the turf mat. The mat fibers together with beneficial additives such as fertilizer provide an ideal medium for germination of the seeds. After the roots have penetrated the lower layer of the mat and entered the soil the mat continues to function as a mulch much in the same way the seedling mat does.

Turf mats can be used advantageously in areas of limited access where hydroseeding equipment could not be easily transported. They are also ideal for initial seeding or patching of small areas where hydroseeding methods would not be economically feasible. They are also well suited for use in speciality areas where special seed is required, as for example in areas of high wear or in floral accent areas. Finally, turf mats are particularly suited for use in contoured areas having cuts, burms or the like.

Figure 12:
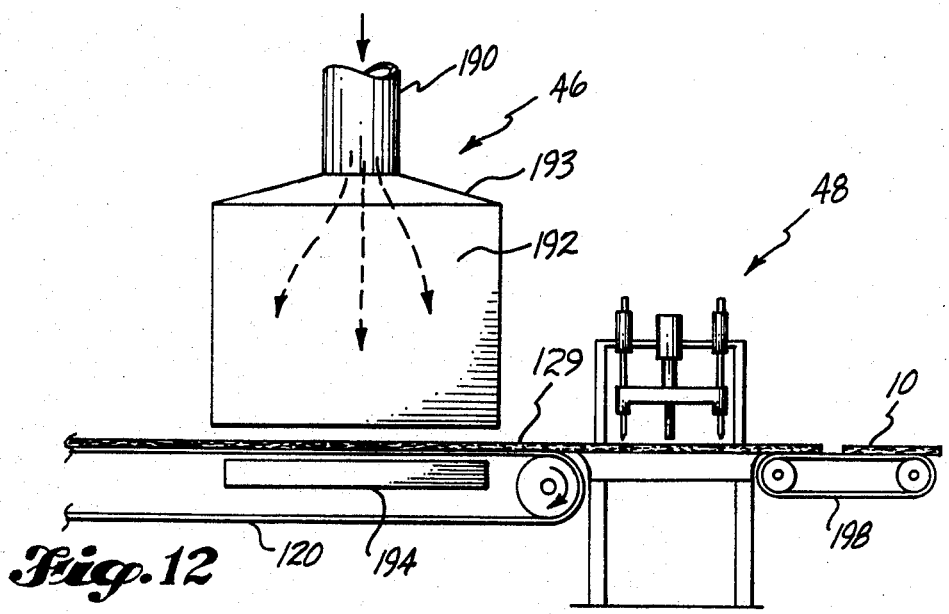
FIG. 12 is a sectional view taken at 12—12 in FIG. 11.

In FIGS. 5 through 12 an apparatus for manufacturing both of the above described embodiments is illustrated. Referring to the schematic diagram of FIG. 5 it can be seen that the apparatus includes a disperser, a forming box assembly, a binder spray box, a press assembly, a dryer and a dye cutter generally indicated by numerals 40, 42, 44, 45, 46 and 48 respectively. The primary function of the disperser, shown in more detail in FIGS. 6 through 8, is to provide a relatively uniform supply of dispersed wood fibers to forming box assembly 42. The disperser includes a hopper 50 into which fibrous material 52 in bulk form is loaded. This material has usually been compacted for shipping and contains many clumps which must be broken up. For this purpose a pair of tined shafts 54 and 56 are mounted for rotation within the lower portion of the hopper. Variable speed auger 58, mounted for rotation near the bottom of the hopper, carries the partially dispersed material toward the right as it rotates and through circular opening 62 which surrounds the auger. The tined shafts and the auger are powered by electric motors 61 and 62, respectively. By varying the rotational speed of the auger, an operator can control the rate at which material is fed into the system.

After leaving the hopper the material falls onto upper surface 64 of conveyor belt 66, made of porous polypropylene, and is moved to the right toward tined shaft 68. Material in this area is also directed downward and retained on the upper surface of the conveyor by air which is drawn downward through the conveyor and into vacuum plenum 70. As the material passes tined shaft 68 the remaining clumps are more thoroughly dispersed by the rapidly revolving closely spaced tines. The width of the layer of fibrous material on conveyor 66 is controlled by the spacing of vertical walls 74 and 76. Its thickness is controlled by the vertical clearance between the tines 72 of shaft 68 and the conveyor belt, preferably ¼ to ⅜ inch. As the material moves further to the right, it is drawn up through opening 80 in tubular plenum 82 and carried through duct 84 in a stream of air generated by a centrifugal fan 86. After passing through the fan the fibrous material is relatively well dispersed and uniformly distributed in the stream of air.

The dispersed fibrous material is then directed by duct 84 into manifold 90 which is located at the top of forming box assembly 42 (FIGS. 9 and 10) and passes in preferably equal amounts through branches 92 and 94. Flow rates through the branches can be adjusted if desired by throttle valves 96 and 98 respectively. Continuing downward, the material passes through dispenser tubes 100 and 102 and into chambers 104 and 106 respectively. In order to provide relatively uniform lateral distribution of the material on forming wire 120, dispenser tubes 100 and 102 are oscillated about axes 130 and 132 respectively by oscillator assembly 103. The oscillator assembly includes crankshaft 250 which is rotated by motor 252, and eccentrics 254 and 256 which drive connecting rods 260 and 262 respectively. The material in chamber 104 is directed further downward on a converging path between walls 110 and 112, through opening 114 at the bottom of the chamber and deposited in layer 116 on the upper surface of porous forming wire 120. The material in chamber 106 is similarly directed downward between converging walls 122 and 124, through opening 126 and is deposited in layer 128 on top of layer 116 to form continuous laminated mat 129.

If seeds or other dry additives are to be incorporated within the mat they are supplied at the desired rate through duct 133 and dispenser tube 134 into chamber 135. After passing opening 136 at the base of the chamber they are deposited on layer 116 and subsequently covered by layer 128. In order to provide uniform lateral distribution of the additives, dispenser tube 134 is oscillated about axis 138 by a second oscillator assembly 270 which includes motor 272, eccentric 274 and connecting rod 276. The width of layers 116 and 128 is controlled by the spacing of movable walls 140 and 142 which form the other opposing walls of chambers 104, 106 and 134. Air drawn downward through the forming wire into vacuum plenum 150 acts to retain the materials on the forming wire.

The technique of forming the mat in layers has certain advantages and helps overcome certain problems encountered in previous attempts to manufacture low-density fibrous mats. First, it permits better control over mat density, thickness and overall uniformity. Minor variations in uniformity may occur within a particular layer but tend to be averaged out in the completed mat. Second, the technique permits better control over the distribution of seeds and other additives. In the case of seeds, it may be desirable to place them at a certain depth in the mat. In the preferred embodiment of the turf mat the seeds are centrally located, but their depth could be varied either by varying the relative thickness of the layers or modifying the forming box assembly to provide additional layers. The disclosed method also provides a way to restrict other additives to one particular layer if desired.

After leaving the forming box, mat 129 passes through adhesive spray box 44 where a selected adhesive in liquid form is applied. Adhesive 151 is sprayed downward from oscillating nozzle 152 into converging cavity 154 which is bounded by fixed walls 156 and 158 and movable walls 160 and 162. Penetration of the adhesive through both layers 116 and 128 is improved by vacuum plenum 164 which draws air downward through the layers and the forming wire.

Next the mat 129 passes into press assembly 45 which preferably includes nip roll press 170, belt 172 and vacuum plenum 174. The function of the press is to compress the mat so that the adhesive is more thoroughly distributed throughout the fibers and the combined thickness of both layers is reduced to the final desired thickness "t" of the finished mat. Belt 172 passes around press roller 176 and roller 178 and cooperates with vacuum plenum 174 to prevent the adhesive laden layers from adhering to and curling around roller 176. The layers may attempt to adhere to lower surface 180 of the belt but air being drawn down through the forming wire into the plenum will retain the layers on the wire. In the preferred embodiment the roll press also acts as the drive for the forming wire.

Next mat 129 pass into dryer 46 where it is exposed to a downward flow of heated air. Air enters through duct 190, passes downward through housing 192, the mat, the forming wire and into vacuum plenum 194. In the preferred embodiment, air enters the dryer at approximately 165° F. but for more rapid drying air temperatures up to approximately 300° could be used. Finally, the mat passes off the forming wire into steel rule die cutter 48, the details of which are well known, whereat is cut either into the seedling mat or turf mat configuration as desired. After being cut, each completed mat 10 is pushed onto conveyor 198 by mat 129 as it advances into the press.

In order to reduce the tendency of the mats to stick to the forming wire and prevent clogging of pores in the wire, the wire is passed through cleaning assembly 200 as it returns to the forming box. The cleaning assembly includes a dry brush roller, a vacuum, a wet spray wash, and finally a dryer. Details of the cleaning assembly should be obvious and are therefore not shown.

Thus it can be seen that the subject invention provides for an improved fibrous mat together with a method and apparatus for manufacturing the same which incorporate many novel features and offer significant advantages over the prior art. Although only two specific embodiments of the mat and one embodiment of the manufacturing apparatus have been illustrated and described, it is to be understood that obvious modifications and changes may be made in them without departing from the true scope and spirit of this invention.

I claim:

1. An apparatus for manufacturing a low-density mat of lignocellulose fibers from lignocellulose fibers in the form of compacted, loose fibers in bulk form comprising:
    (a) means for controllably dispersing fibers into an air stream, such dispersing means comprising a hopper for receiving lignocellulose fibers in a compacted, bulk form, mounted in a lower portion of said hopper at least one rotatable tined shaft, and a screw conveyor said shaft being mounted above said screw conveyor such as to feed said fibers to said screw conveyor, a porous conveyor for use in dispersing the fibers and for receiving the fibers from the screw conveyor; a tined shaft rotatably mounted above the porous conveyor for dispersing the fibers on the porous conveyor when the tines travel counter to the fibers onto the porous conveyor; said screw conveyor means proximate to the tined shaft for drawing the fibers onto the porous conveyor, and a plenum, through which the dispersed fibers on the porous conveyor may enter the air stream at a controlled and uniform rate, such plenum having walls defining an opening extending across the porous conveyor;
    (b) an air conveyor for transporting the dispersed fibers from the plenum;

(c) a traveling, forming wire on which the mat can be formed; and
(d) means for dispersing at least one layer of dispersed fibers from the air stream onto the forming wire to form a continuous fiber mat of uniform, low density.

2. The apparatus of claim 1 wherein said means for controlled dispersing of the fibers includes two oppositely rotating, parallel tined shafts positioned within the hopper to break up clumps of fibers.

3. The apparatus of claim 2 wherein said means for controllably dispensing the fibers includes a variable-speed auger screw conveyor disposed within the hopper to control the rate of discharge of fibers from the hopper.

4. The apparatus of claim 1 wherein said means for drawing the fibers downward onto the porous conveyor includes a pneumatic system for drawing air downward through the conveyor.

5. The apparatus of claim 1 wherein the plenum through which the fibers enter the air stream comprises a duct extending transversely to the conveyor, and having a lower surface defining a slot which extends transversely across the conveyor.

6. An apparatus for manufacturing a low-density mat of lignocellulose fibers from lignocellulose fibers in the form of compacted loose fibers in bulk comprising:
(a) means for controllably, dispensing the fibers into an air stream, such dispensing means comprising a hopper for receiving lignocellulose fibers in a compacted, bulk form, a pair of oppositely rotating, parallel tined shafts mounted within the hopper near its bottom interior to break up clumps of fibers; a variable-speed auger disposed within the bottom of the hopper to feed fluffed, fiber from the hopper at a controlled rate, a conveyor having a porous surface for receiving the fibers from the hopper and dispersing the fibers, a tined shaft rotatably mounted above the conveyor for dispersing fibers on the conveyor when the tines are rotated counter to the flow of the fibers from the hopper on the conveyor, means proximate to the tined shaft for drawing the fibers onto the conveyor, and a plenum, through which the dispersed fibers on the conveyor may enter the air stream at a controlled and uniform rate, such plenum having walls defining a slot extending transversely above the conveyor and downstream from the tined shaft;
(b) an air conveyor for transporting the dispersed fibers from the plenum;
(c) a traveling, forming wire on which the mat can be formed; and
(d) means, receiving the dispersed fibers from the air conveyor, for dispensing at least one layer of dispersed fibers onto the forming wire to form a continuous mat of uniform low density.

* * * * *